United States Patent

[11] 3,618,694

| [72] | Inventor | Walter A. Crowley |
| | | Seattle, Wash. |
| [21] | Appl. No. | 864,093 |
| [22] | Filed | Oct. 6, 1969 |
| [45] | Patented | Nov. 9, 1971 |
| [73] | Assignee | Aero-Go, Inc. |
| | | Seattle, Wash. |

[54] HOP-FREE FLUID BEARING OF SPANDREL INFLATED FLEXIBLE TYPE
13 Claims, 11 Drawing Figs.

| [52] | U.S. Cl. | 180/124 |
| [51] | Int. Cl. | B60v 1/00 |
| [50] | Field of Search | 180/124, 125, 121, 127 |

[56] References Cited
UNITED STATES PATENTS

| 3,082,836 | 3/1963 | Billman | 180/124 |
| 3,161,247 | 12/1964 | Mackie | 180/124 |
| 3,327,799 | 6/1967 | Guienne et al | 180/124 |
| 3,416,626 | 12/1968 | Nagamatsu | 180/124 |

*Primary Examiner*—A. Harry Levy
*Attorney*—Christensen, Sanborn & Matthews

ABSTRACT: An improved hop-free fluid bearing is disclosed of the flexible type wherein the opposing wall of the flexible annular body is interconnected with the backing member radially outwardly from the inner peripheral edge of the body, and the fluid is discharged into the spandrellike space formed therebetween, both to inflate the body and to pressurize the plenum. The bearing is hop-free by virtue of the inflow openings of the body being grouped within the narrow circumferential segment of the space opposite the inlet, and having an aggregate open cross-sectional area undersized with respect to the inlet, so that a siphoning effect is generated in some of the openings as the fluid travels through the space, there being, however, at least one opening relatively radially offset from the inlet in a region of relatively high static pressure when the body is in a deflated condition, so that the fluid is operative to inflate the body during the initial stage of fluidization.

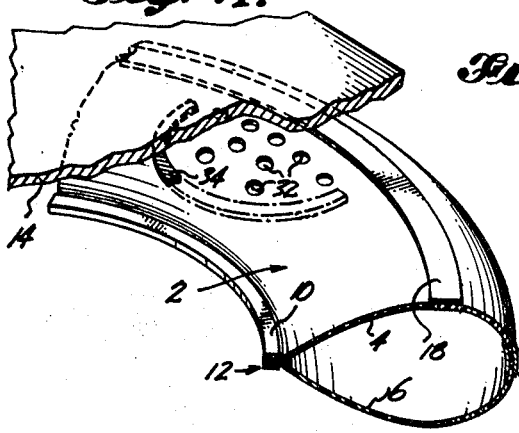
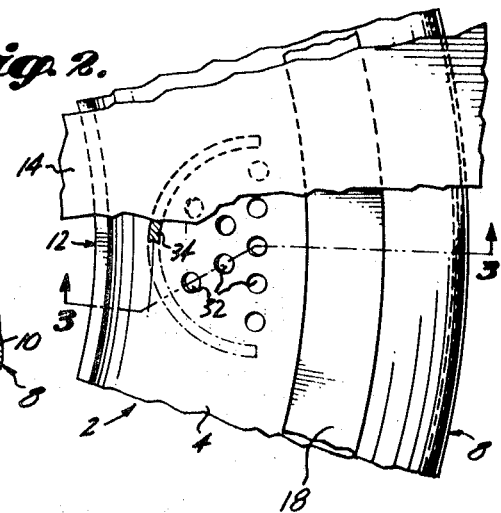
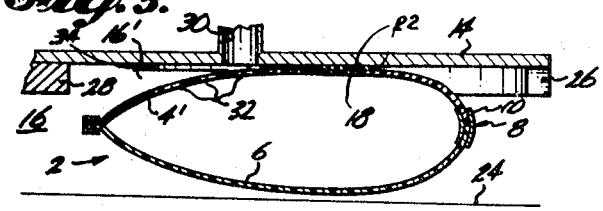
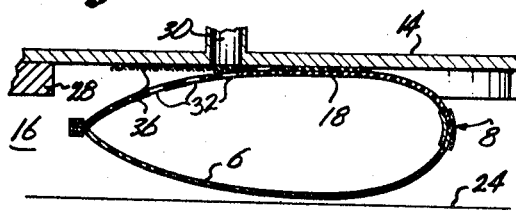
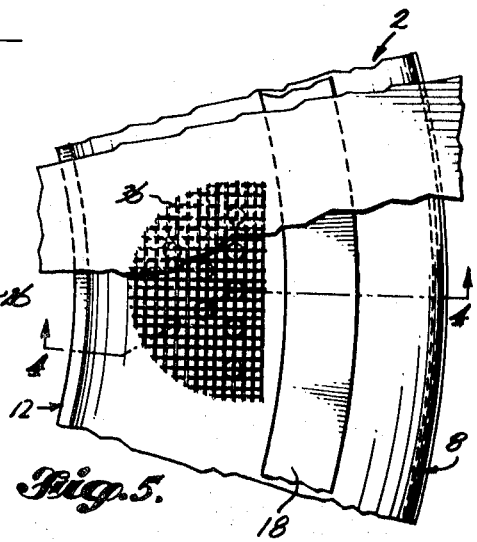
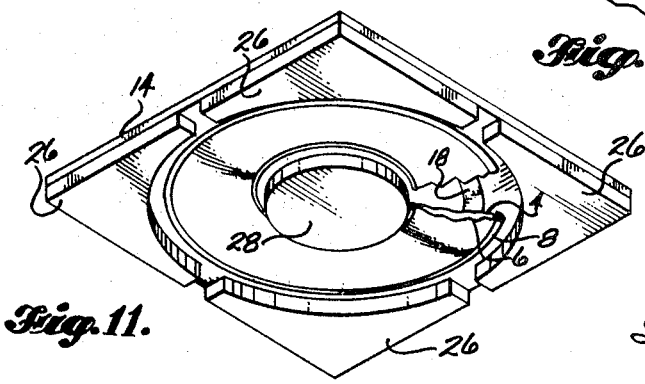
INVENTOR:
WALTER A. CROWLEY
BY Christensen,
Sanborn and Matthews
ATTORNEYS

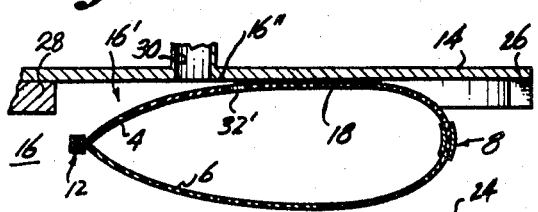
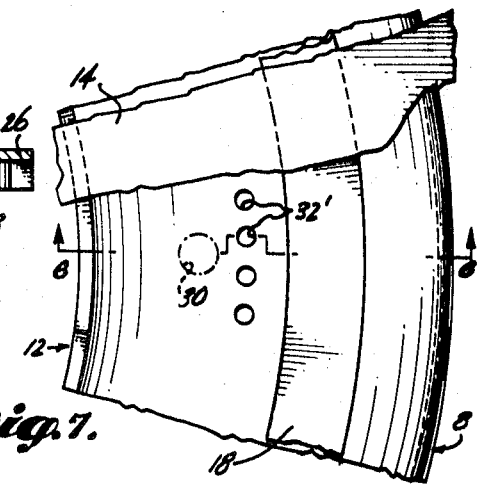
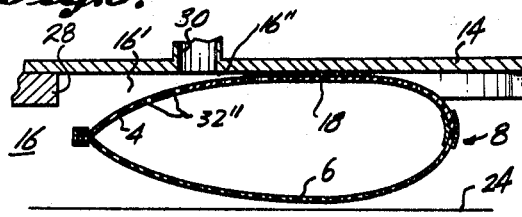
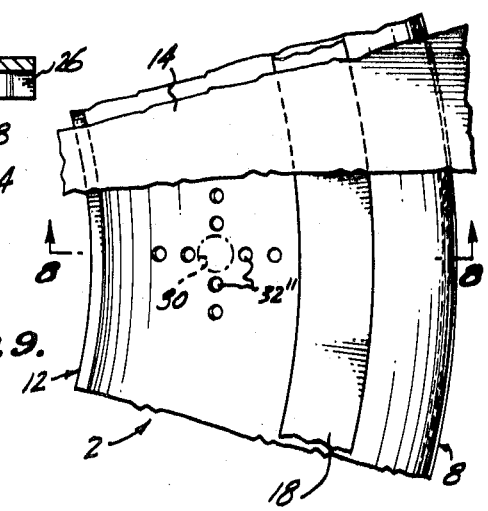
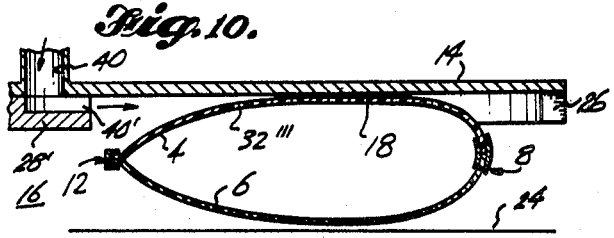

HOP-FREE FLUID BEARING OF SPANDREL INFLATED FLEXIBLE TYPE

FIELD OF THE INVENTION

This invention relates to fluid bearings, and in particular to fluid bearings of the flexible type disclosed in my copending application Ser. No. 763,680 with Kenneth G. Wood, filed on Sept. 30, 1968 and entitled Fluid Bearing Device With Self-Regulating Action and since issued as U.S. Pat. No. 3,513,936

BACKGROUND OF THE INVENTION INCLUDING CERTAIN OBJECTS THEREOF

In the aforesaid application, the gearing member has an annular body which is hollow and has flexible upper and lower annularly shaped walls so as to be inflatable to form a torus. A backing member is disposed opposite one of the aforesaid flexible annularly shaped walls of the body, and interconnected with the body around the entire circumference thereof so as to form a plenum within the opening defined by the torus when the body is inflated. Moreover, the interconnection between the body and the backing member is radially outwardly spaced from the inner peripheral edge of the body, between the aforesaid one wall of the body and the backing member, so that on inflation of the body the inner peripheral edge portion of the one wall is free to separate from the backing member to form a spandrellike space therebetween which is in open communication with the plenum at the adjacent inner and outer peripheries thereof, respectively. Inflation and fluidization are accomplished through an inlet opening in the backing member spaced radially inwardly from the aforesaid interconnection, and an inflow opening in the aforesaid inner peripheral one wall edge portion of the body. The inlet and inflow openings are cooperatively disposed so that when the body is in a deflated condition and a stream of pressurized fluid is fed through the inlet opening in the backing member, initially the major portion of the stream is discharged into the body through the inflow opening therein, to inflate the body and form the aforesaid spandrellike space between the body and the backing member. Thereafter the fluid is discharged into the spandrellike space itself for pressurization of the plenum so that the torus can operate as a fluid bearing. Preferably, the inlet opening in the backing member is disposed opposite the spandrellike space in plan view, and the inflow opening in the inner peripheral one wall edge portion of the body is in vertical registry therewith. Also, the inner peripheral one wall edge portion of the body preferably has a plurality of additional surge release openings therein, spaced about the circumference of the body. In fact, as many as 32 additional surge release openings are employed; and together, the additional openings have a combined open cross-sectional area exceeding the open cross-sectional area of the inflow opening in the body, as well as that of the inlet opening in the backing member. The thought is that the additional openings permit rapid communication between the body and the plenum and therefore rapid equalization of the respective pressures in the body and the throttling gap therebelow, particularly when the bearing experiences an unbalanced load or an uneven floor surface, tending to produce an increase in the outflow through the gap under the body. However, while these features are effective to regulate the throttling action of the body, I have found that the body is also subject to "hop," that is, to cyclic up and down motion which produces an instability in the bearing from time to time.

One object of the present invention therefore, is to provide a fluid bearing of the foregoing type which is relatively or substantially free from "hop" in performance. Another object is to provide a fluid bearing of this type which compared to the earlier units, is capable of hop-free performance over wider ranges of fluid flow conditions, and floor surface conditions; and which moreover, is capable of moving between relatively rough and smooth floor surfaces without the necessity for reducing the fluid flow to prevent hopping. A further object is to provide a fluid bearing of this type which has greater tolerance to mechanical oscillations produced by changes in the loading and/or handling conditions; and also greater tolerance to rapid pressure increases which may occur in the fluidization system, either in the initial fluidization stage or in subsequent operational stages when transient pressure pulses may occur. Other objects include providing a fluid bearing of this type which makes more efficient use of the fluid supply, which has a more stable inflation height, and which overall, has better loading and handling characteristics than the earlier units. Still further objects will become apparent from the description of the invention which follows hereafter.

SUMMARY OF THE INVENTION

These objects and advantages are realized by a new means and technique I have devised for inflating the body and pressurizing the plenum so that the torus can operate as a fluid bearing. According to my invention, there is, as before, at least one inlet operatively disposed in the backing member, relatively radially inwardly from the aforesaid interconnection between the body and the backing member, for discharging a stream of pressurized fluid into the spandrellike space between the backing member and the inner peripheral one wall edge portion of the body. However, for each inlet, there is a plurality or set of inflow openings in the inner peripheral one wall edge portion of the body, which are disposed on closely spaced centers within the narrow circumferential segment of the space opposite the inlet. Moreover, the aforesaid inflow openings have a combined open cross-sectional area that is no greater than the open cross-sectional area of the inlet, so that a siphoning effect is generated in the openings as the stream of fluid travels through the space. This siphoning effect absorbs or dampens any tendency for pressure surging or "crosstalk" between the torus and the plenum; and assures in turn that the bearing will operate hop-free, while still maintaining the rapid pressure equalization characteristics of earlier units. However, at least one opening must be relatively radially offset from the inlet, in a region of relatively high static pressure when the body is in a deflated condition, so that the stream of fluid is operative to inflate the body when it is initially discharged between the body and the backing member.

In order to maximize the siphoning effect, preferably the remainder of the inner peripheral one wall edge portion of the body, between the aforesaid circumferential segment or segments of the space, is imperforate.

The device may be adapted in one of several ways to assure that the body will inflate. For example, my presently preferred practice is to offset the aforesaid one inflow opening or openings in each set of openings, relatively radially inwardly from the inlet; and to provide the backing member with choke means which are operative to cause a pressure drop in the stream of fluid when it is initially discharged between the body and the backing member, but which become relatively inoperative when the body is inflated. For example, the choke means may take the form of an arcuate rib or weir which is interposed between the body and the backing member, relatively radially inwardly from the openings. Or they may take the form of a screen which is interposed between the body and the backing member, opposite the openings.

In other embodiments of the invention, the inlet is disposed in plan view, opposite a point on the inner peripheral one wall edge portion of the body, and the openings are all spaced relatively radially therefrom, there being at least one opening interposed in the static pressure region between the point and the aforesaid interconnection, to enable the stream of fluid to inflate the body during the initial fluidization stage. In fact, all of the openings may be interposed between the point and the interconnection; or they may be distributed in part relatively circumferentially spaced from the point, as for example, where the openings are distributed symmetrically about the point.

In still another embodiment, the backing member has a step raised thereon at a point spaced relatively radially inwardly from the inner peripheral edge of the body, and the inlet is disposed in the periphery of the step, to discharge relatively radially outwardly therefrom. When the body is in a deflated condition, the static pressure between the body and the backing member is sufficiently high to enable the stream of fluid to inflate the body in such a case. The step may be formed by a rigid pad which projects from the backing member, through and beyond the opening defined by the body when the body is in a deflated condition, but which lies wholly within the opening defined by the torus when the body is in an inflated condition. Such a pad may also serve as a supporting land for the backing member, in those instances where the backing member is superposed over the body to form a platform for travelling over a surface therebelow.

BRIEF DESCRIPTION OF THE DRAWINGS

These features will be better understood by reference to the accompanying drawings which illustrate certain of these embodiments as they are applied to a platform-type device.

In the drawings, FIG. 1 is a part perspective view of a platform device employing an arrangement of radially inwardly spaced openings in the inflatable body with a weir to control fluid flow;

FIG. 2 is a plan view of the part perspective representation in FIG. 1;

FIG. 3 is a cross-sectional view of the embodiment in FIGS. 1 and 2, along the line 3—3 of FIG. 2;

FIG. 4 is a similar cross-sectional view along line 4—4 of FIG. 5, illustrating a radially inwardly offset version employing a screen as the choke means;

FIG. 5 is a part plan view of the screened version;

FIG. 6 is a cross-sectional view along the line 6—6 of FIG. 7, illustrating an embodiment wherein the inflow openings are radially outwardly spaced from a point opposite the inlet;

FIG. 7 is a part plan view of the inflatable body in FIG. 6;

FIG. 8 is a cross-sectional view similar to FIG. 6, illustrating an embodiment wherein the openings are all spaced relatively radially away from the inlet;

FIG. 9 is a view similar to that in FIG. 7, of the embodiment in FIG. 8; and

FIG. 10 is a cross-sectional view of a further embodiment employing a peripheral inlet in the center landing pad.

FIG. 11 is an isometric view of the bottom of the platform, showing the center and peripheral landing pads.

DESCRIPTION OF THE PREFERRED EMBODIMENTS

Referring to the drawings, it will be seen that the device illustrated in FIGS. 1-3 comprises an annular body 2 which is hollow and has flexible upper and lower annularly shaped walls 4 and 6, respectively, so as to be inflatable to form a torus. The walls are separately formed from a cloth material impregnated with an elastomer, such as 32 ounce Neoprene-coated nylon material, or some other such lightweight, thin, flexible cloth material, coated perhaps with Hypalon, polyurethane, vinyl, or Nordel, in lieu of the Neoprene. The two pieces of elastomer impregnated cloth material are cut to size and shape, and then bonded to one another at their inner and outer peripheries by well known vulcanization techniques. The outer peripheral seam 8 of the body is formed by bonding a strip of bias tape 10 (cut on a 45° angle to the thread direction) to the upper wall 4 and lower wall 6 on the outside, or on the inside, or for extra strength, on both sides as shown. The inner peripheral seam 12 is normally bonded together and sewn prior to vulcanization, and may additionally have a strip of bias material applied as shown for heavy-duty applications.

The device also comprises a rigid platform 14 which is disposed opposite the upper wall 4 of the body, and interconnected with the body around the entire circumference thereof so as to form a plenum 16 within the opening defined by the torus when inflated. The interconnection 18 between the body and the platform is radially outwardly spaced from the inner peripheral edge 12 of the body, and is formed by bonding the upper surface of upper wall 4 to the lower surface of the platform in the narrow band of area 22 as shown, representing a circular vulcanized seal line between the body and the platform. While the bondings along this seal line and the inner and outer peripheral seams 12 and 8 are preferably all vulcanized, they may be but are not necessarily formed at the same time.

When the body is in a deflated condition, the platform 14 rests on a surface 24 therebelow, supported by outer peripheral pads 26 and a centrally disposed inner pad 28, (FIG. 11) of semirigid material such as solid rubber, holding the platform above the surface and accommodating the deflated torus in the space therebetween. The centrally disposed pad 28 depends from the platform through and beyond the opening defined by the torus when it is deflated, but as indicated, the pad lies wholly within the opening 16 defined by the torus when it is inflated. The total surface area of the landing pads is designed for certain applications, such as for cargo floors of aircraft, so that it is substantially equal to the total lift area formed by the flexible air bearing body when inflated. The floor loading is then substantially the same per unit area whether the loaded pallet is inflated or deflated.

The torus operates in known fashion as a fluid bearing for the platform when both the body and the plenum are pressurized with fluid. The means for fluidizing the two includes one or more symmetrically arranged inlets 30 in the platform, each of which is operatively disposed relatively radially inwardly from the interconnection 18, for discharging a stream of pressurized fluid such as air into the spandrellike space 16' which is formed between the platform and the inner peripheral edge portion 4' of the upper wall 4 of the body, when the body is inflated. The body is inflated through a set of inflow openings 32 for each inlet, which are disposed in the inner peripheral upper wall edge portion 4' of the body, on closely spaced centers within the circumferential segment of the space 16' opposite the inlet 30. Each opening has a diameter typically one-fifth to one-third that of the inlet, so that the combined open cross-sectional area of the openings is no greater than the open cross-sectional of the inlet, and preferably considerably less than the latter, i.e. one half the latter. As a consequence, as the fluid rushes through the space from the inlet, a siphoning effect is generated in the openings and this in turn has a tendency to dampen pressure surges that would otherwise occur between the body and the plenum, for example, on a rough surface. However, because of this siphoning effect, the body will not inflate when the stream is initially discharged between the body and the platform, unless there is some means for temporarily overriding or choking the effect until the body has inflated. As seen, many of the openings 32 are radially inwardly offset from the inlet 30, and are therefore downstream from the inlet in the region of high-speed laminar flow, or maximum siphoning effect in the openings. Accordingly, the choke means takes the form of an arcuate rib or weir 34 of felt which is adhered or otherwise attached to the underside of the platform, between the body and the platform, radially inwardly from the openings 32. The weir operates as a dam to cause a drop in the velocity of the stream of fluid when it is initially discharged between the body and the platform, and the increased static pressure enables the body to inflate; however, when the body is inflated, the weir is rendered inoperative as seen, so as to not interfere with the discharge of the fluid into the plenum.

Alternatively, the choke means may take the form of a coarse mesh screen 36 which is adhered to the underside of the platform opposite the openings, as in FIGS. 4 and 5. During the initial fluidization stage, the screen operates to raise the static pressure of the fluid stream until the body has inflated; then, like the weir, it is rendered inoperative by the fact that the body has moved away from the platform. Ideally, the centers of openings 32 are spaced apart a distance equal to the diameter of the inlet opening 30.

In the embodiments shown in FIGS. 6 to 9, the inlet 30 is disposed opposite a point on the upper wall of the body in plan view, as in the earlier embodiments, but in this case, the directly opposing portion of the wall is imperforate, and the openings 32' are all offset relatively radially therefrom. Moreover, in FIGS. 6 and 7, the openings are all interposed in the region 16" of high static pressure between the imperforate portion and the interconnection 18 between the body and the platform. Accordingly, the body will inflate and will operate in a reasonably hop-free manner, although the inflation rate is not as well controlled as in the embodiments of FIGS. 1 to 5.

Furthermore, so long as certain of the openings are interposed in this latter region 16" of high static pressure, not all of the openings need be so distributed. For example, in FIGS. 8 and 9, the openings 32' are distributed symmetrically about the imperforate region opposite the inlet, including a small number of openings 32" relatively radially inwardly offset therefrom (FIG. 8).

Going still further, in the embodiment shown in FIG. 10 the inlet 40 is not disposed opposite the upper wall 4 of the body in plan view, but is disposed over the central pad 28 and interconnected with the plenum by means of radially extending channels 40' in the pad 28 itself, which discharge the fluid radially outwardly therefrom. In this instance, the whole of the gap 16" between the body and the platform, performs a choking effect on the stream in the initial stage of fluidization, so that inflation can occur through openings 32''' fairly deeply inset therein.

What is claimed is:

1. In combination, an annular body which is hollow and has flexible upper and lower annularly shaped walls so as to be inflatable to form a torus, a rigid backing member which is disposed opposite one of the aforesaid flexible annularly shaped walls of the body and interconnected with the body around the entire circumference thereof so as to form a plenum within the opening defined by the torus when the body is inflated, the aforesaid interconnection between the body and the backing member being radially outwardly spaced from the inner peripheral edge of the body, between the aforesaid one wall of the body and the backing member, so that on inflation of the body the inner peripheral edge portion of the one wall is free to separate from the backing member to form a spandrellike space therebetween which is in open communication with the plenum at the adjacent inner and outer peripheries thereof, respectively, and means for inflating the body and pressurizing the plenum so that the torus can operate as a fluid bearing, including at least one inlet in the backing member, which is operatively disposed relatively radially inwardly from the aforesaid interconnection, for discharging a stream of pressurized fluid into the spandrellike space, and a set of inflow openings for each inlet, which are disposed in the aforesaid inner peripheral one wall edge portion of the body, on closely spaced centers within the circumferential segment of the space opposite the inlet, and which have a combined open cross-sectional area that is no greater than the open cross-sectional area of the inlet, so that a siphoning effect is generated in the openings as the stream of fluid travels through the space, there being at least one opening, however, which is relatively radially offset from the inlet, in a region of relatively high static pressure when the body is in a deflated condition, so that the stream of fluid is operative to inflate the body, when it is initially discharged between the body and the backing member.

2. The combination according to claim 1 wherein the remainder of the inner peripheral one wall edge portion of the body, between the aforesaid circumferential segment or segments of the space, is imperforate.

3. The combination according to claim 1 wherein the aforesaid one opening or openings in each set of openings, are radially inwardly spaced from the inlet, and the backing member has choke means thereon which are operative to cause a pressure drop in the stream of fluid, during the aforesaid initial stage of fluidization, but which are relatively inoperative when the body is inflated.

4. The combination according to claim 3 wherein the choke means takes the form of an arcuate weir which is interposed between the body and the backing member, radially inwardly from the openings.

5. The combination according to claim 3 wherein the choke means takes the form of a screen which is interposed between the body and the backing member, opposite the openings.

6. The combination according to claim 1 wherein the inlet is operatively disposed in plan view, opposite a point on the inner peripheral one wall edge portion of the body, and the openings are all spaced relatively radially therefrom, there being at least one opening, however, which is interposed between the aforesaid point and interconnection, to enable the stream of fluid to inflate the body.

7. The combination according to claim 6 wherein all of the openings are interposed between the point and the interconnection.

8. The combination according to claim 6 wherein at least two of the remaining openings are relatively circumferentially spaced from the point.

9. The combination according to claim 6 wherein the openings are distributed symmetrically about the point.

10. The combination according to claim 1 wherein the backing member has a step raised thereon at a point spaced relatively radially inwardly from the inner peripheral edge of the body, and the inlet is disposed in the periphery of the step, to discharge relatively radially outwardly therefrom.

11. The combination according to claim 10 wherein the step is formed by a rigid pad which projects from the backing member, through and beyond the opening defined by the body when the body is in a deflated condition, but which lies wholly within the opening defined by the torus when the body is in an inflated condition.

12. The combination according to claim 11 wherein the backing member is superposed over the body to form a platform, for travelling over a surface therebelow, and the pad operates as a supporting land for the platform when the body is in a deflated condition.

13. The combination according to claim 1 wherein the backing member includes pad means depending therefrom to form a supporting land for the platform when the body is in a deflated condition, said pad means including a central pad positioned within the center of said annular body and peripheral pad means positioned outside thereof and spaced from said central pad to accommodate the deflated body therebetween, the total supporting area bound by said pad means being substantially equal to the lift area formed by the body when inflated.

* * * * *